United States Patent [19]
Becker

[11] 3,934,487
[45] Jan. 27, 1976

[54] VEHICLE STEERING COLUMN
[75] Inventor: Burkhardt Becker, Wolfsburg, Germany
[73] Assignee: Volkswagenwerk Aktiengesellschaft, Wolfsburg, Germany
[22] Filed: July 5, 1974
[21] Appl. No.: 486,075

[30] Foreign Application Priority Data
July 20, 1973 Germany............................ 2336968

[52] U.S. Cl........................ 74/492; 64/12; 64/15 B
[51] Int. Cl.²........................ G05G 1/08; F16D 3/56
[58] Field of Search .............. 64/12, 15 B, 19, 27 B; 74/492, 493

[56] References Cited
UNITED STATES PATENTS

| | | | |
|---|---|---|---|
| 1,777,895 | 10/1930 | Roderick | 64/12 X |
| 2,968,169 | 1/1961 | Davis | 64/15 B |
| 3,468,183 | 9/1969 | Shwartzberg | 64/15 X |
| 3,481,158 | 12/1969 | Mayerjak | 64/15 B X |
| 3,486,395 | 12/1969 | Yoshioka | 74/492 |
| 3,600,969 | 8/1971 | Pitner | 74/492 |

FOREIGN PATENTS OR APPLICATIONS

| | | | |
|---|---|---|---|
| 853,804 | 12/1939 | France | 64/15 B |
| 861,600 | 2/1961 | United Kingdom | 64/15 B |

*Primary Examiner*—Allan D. Herrmann
*Attorney, Agent, or Firm*—Brumbaugh, Graves, Donohue & Raymond

[57] ABSTRACT

A steering column for a vehicle comprises two rotatable stub shafts coupled to a steering wheel for the vehicle and a steering gear for the vehicle, respectively. A rotatable steering shaft extends between the two stub shafts and couplings connect opposite ends of the steering shaft to different ones of the two stub shafts. At least one of the couplings is relatively torsion-stiff and couples the steering shaft to one of the stub shafts so as to define an angle between the shafts. The coupling includes at least two portions that are fabricated of metal plate. The two portions of the coupling are coupled together and are oriented transversely of each other. One of the portions of the coupling is rigidly connected to an end of the steering shaft and the other is rigidly connected to an end of the one stub shaft.

1 Claim, 6 Drawing Figures

VEHICLE STEERING COLUMN

BACKGROUND OF THE INVENTION

In order to provide a steering wheel, in an automobile, for example, that can be tilted and otherwise adjusted for the convenience of the driver, it has been proposed to replace the conventional one-piece steering shaft that connects the steering wheel to the steering gear or steering box with a segmented column. Such a segmented steering column comprises a main shaft connected at its ends to two stub shafts that are joined to the steering wheel and to the steering gear, respectively. At the junctions between the main shaft and each of the stub shafts, universal joints facilitate the desired tilting and other adjustments of the steering wheel. Such universal joints are relatively resistant to torsion or torsion-stiff and prevent significant losses of rotational movement in transferring the movement from the steering wheel to the steering gear. Examples of a segmented steering column, as described above, are described and illustrated in Pitner U.S. Pat. No. 3,600,969 and in the Oct. 19, 1968 issue of the popular German bi-weekly magazine "MOT", at pages 50 and 52.

SUMMARY OF THE INVENTION

The present invention is directed to a vehicle steering column that is segmented and utilizes joints or couplings that are relatively torsion-stiff but less expensive to manufacture than conventional universal joints. A steering column according to the invention comprises one rotatable stub shaft connected to the steering wheel for a vehicle, such as an automobile, and a second rotatable stub shaft connected to the steering gear for the vehicle. A rotatable steering shaft extends between the two stub shafts. Couplings join the ends of the steering shaft to different ones of the two stub shafts and at least one of the couplings joins the steering shaft to one of the stub shafts so as to define an angle between the shafts. This coupling is relatively torsion-stiff and includes at least two portions that are fabricated of metal plate. The two portions of the coupling are coupled together and are oriented transversely of each other. One of the two coupling portions is rigidly coupled to an end of the steering shaft and the other coupling portion is rigidly coupled to an end of the one stub shaft. The flexibility of the metal plate permits the steering shaft and the one stub shaft to be oriented at an angle to each other, just as with a conventional universal joint, providing that the angle is not too great.

In one embodiment of the invention, a coupling according to the invention includes a metal stamping having four arms that are interconnected at corresponding ends so that the stamping has a cross-like configuration. Each individual arm has a U-shaped configuration such that the two ends of the arm are spaced from each other. The free ends of two opposed arms of the cross-like stamping are located on one side of the interconnected ends of the stamping arms and are rigidly coupled to an end of the steering shaft. The free ends of the other two opposed arms of the cross-like stamping are located on the other side of the interconnected ends of the arms and are rigidly coupled to an end of one of the stub shafts.

In another embodiment of the invention, the inventive coupling includes two strips fabricated of metal plate. Each strip includes two spaced apart linear sections and at least one curved section interconnecting adjacent ends of the two linear sections. The two strips are oriented transversely of each other and one linear section of each strip is rigidly coupled to an adjacent linear section of the other strip so that together the two strips present a cross-like configuration. The linear sections of the two strips which are not joined together are located on opposite sides of the rigidly coupled linear sections and are rigidly coupled to an end of the steering shaft and to an end of one of the stub shafts, respectively.

The inventive coupling of a third embodiment of the invention includes a metal stamping having four arms disposed in a cross-like configuration. A metal strip is rigidly coupled intermediate its ends to an end of the steering shaft and is rigidly coupled at its ends to two opposed arms of the cross-like stamping. A second metal strip is rigidly coupled at its ends to two different opposed arms of the cross-like stamping and intermediate its ends to an end of the stub shafts. The first metal strip is located on one side of the cross-like stamping and the second metal strip is located on the other side of the cross-like stamping.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF EMBODIMENTS

Figure 1:
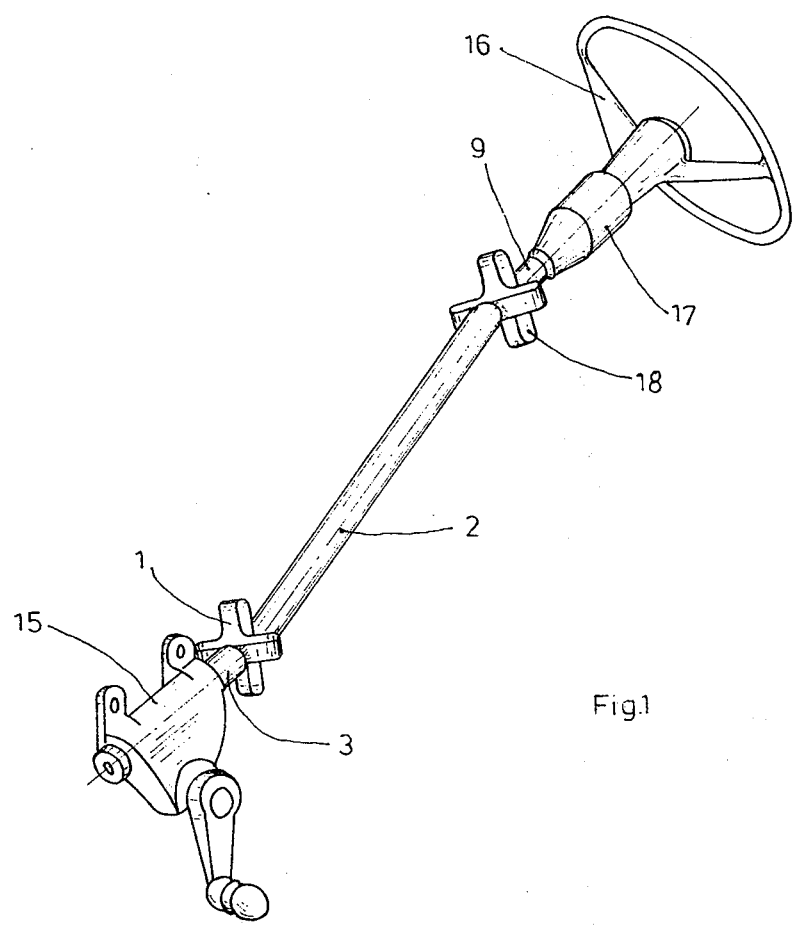
FIG. 1 is a perspective view of an automobile steering column according to the invention.

FIG. 1 of the drawings illustrates, in perspective, a segmented steering column for a vehicle, such as an automobile. The segmented column joins the automobile steering wheel 16 to the steering box or gear 15 so that rotational movement of the steering wheel is transmitted to the steering gear and thus to the front axle and wheels (not shown). The steering column includes an elongated, centrally located steering shaft 2 coupled at opposite ends by joints or couplings 1 and 18 to stub shafts 3 and 9, respectively. The stub shaft 3 is, in turn, connected to the steering gear 15, while the stub shaft 9 is connected to the steering wheel 16 and is journaled in a mount 17 fixed to the automobile body (not shown). As can be seen in FIG. 1, the steering shaft 2 is oriented at a slight angle to both the stub shaft 3 and the stub shaft 9. The two joints 1 and 18 which couple the steering shaft 2 to the stub shaft 3 and 9, respectively, are relatively torsion-stiff and replace conventional universal joints, such as illustrated in Pitner U.S. Pat. No. 3,600,969. The two joints 1 and 18 are substantially identical and will be described in detail hereinafter with reference to joint 1 only.

Figure 2A:
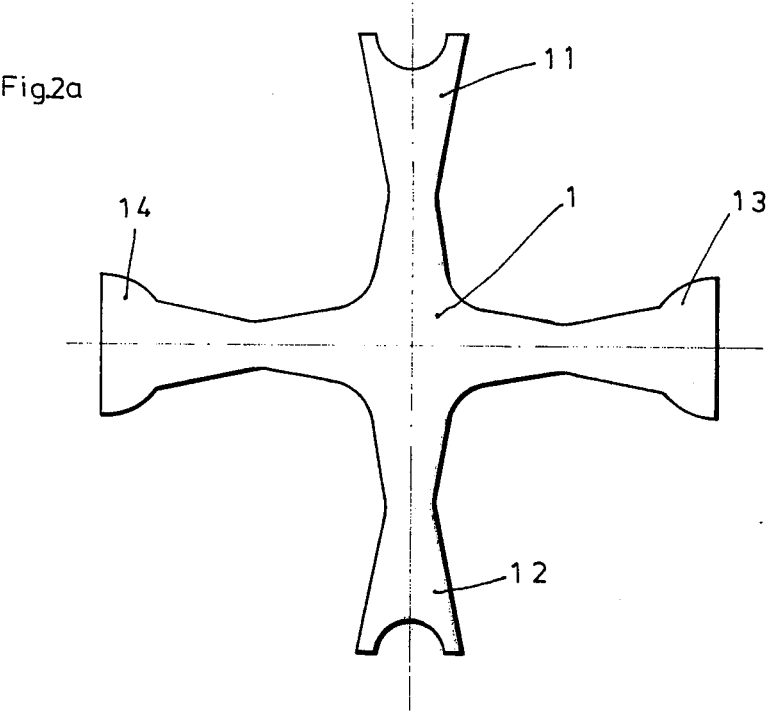
FIG. 2a is a plan view of a metal stamping utilized in fabricating one of the joints in the steering column illustrated in FIG. 1.
Figure 2C:
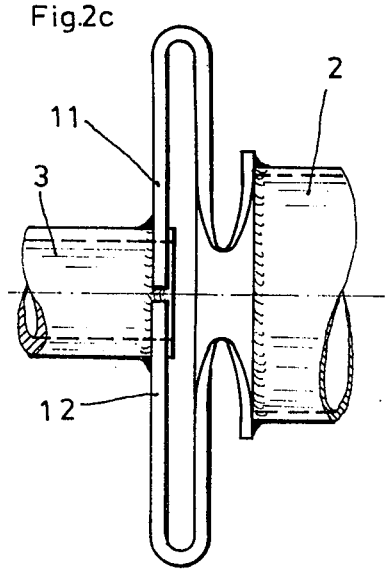
FIG. 2c is a side sectional view of the stamping illustrated in FIG. 2b.
Figure 2B:
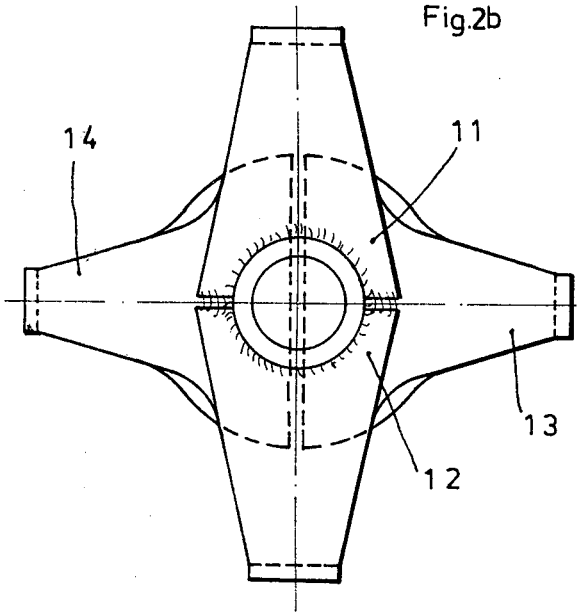
FIG. 2b is a plan view of the stamping of FIG. 2a, after the stamping is bent into final form and installed in the steering column of FIG. 1.

As shown in FIG. 2a, the torsion-stiff joint 1 is formed from a cross-like metal stamping having four interconnected arms 11, 12, 13 and 14. Each of the arms 11–14 is joined at one end to each of the other arms at the center of the metal stamping. In fabricating the joint 1, the arms 11–14 are doubled over in U-shaped configurations with pairs of opposed arms 11, 12 and 13, 14 on different sides of the central portion of the stamping. As illustrated in FIGS. 2b and 2c, the opposed arms 11 and 12 are doubled over so that the free ends of the arms overlap the central portion of the stamping and are spaced from the central portion of the stamping. The other two opposed arms 13 and 14 are also bent over so that the free ends of the arms lie on the side of the central portion of the stamping opposite the free ends of the arms 11 and 12. The free ends of arms 11 and 12 are welded, for example, to an end of the stub shaft 3, while the free ends of the arms 13 and 14 are welded to an adjacent end of the steering shaft 2. Since the joint 1 is fabricated from metal plate, the completed joint is relatively resistant to torsion, yet may be flexed so that the two shafts 2 and 3 can be oriented at an angle (other than 180°) to each other.

Figure 3:
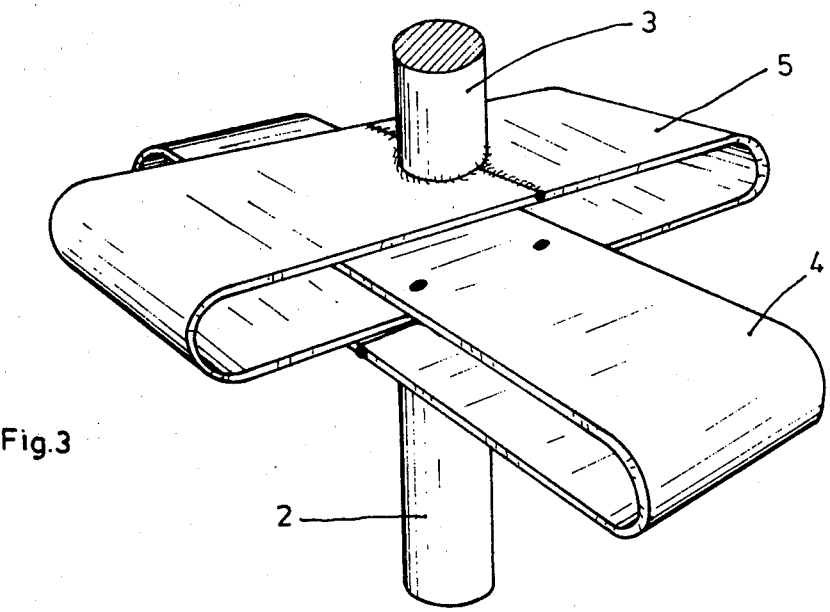
FIG. 3 is a perspective view of a second embodiment of a joint to be used in a steering column according to the invention.

FIG. 3 of the drawings illustrates a second embodiment of a joint, suitable for use in the steering column of the invention, which includes two strips of metal plate 4 and 5. The two strips 4 and 5 are metal stampings that are joined together at their ends by welding, for example, to form closed loops that are oblong in cross-section. Each looped strip 4 and 5 has two opposed and generally parallel linear sections joined at their ends by two curved sections. As can be seen in FIG. 3, the two strips 4 and 5 are oriented transversely of each other when assembled into a joint or coupling, with adjacent linear sections of the strips rigidly connected together by welding or riveting, for example. The linear sections of the strips 4 and 5 which are not connected together are rigidly connected by welding, for example, to the steering shaft 2 and the stub shaft 3, respectively.

Figure 4:
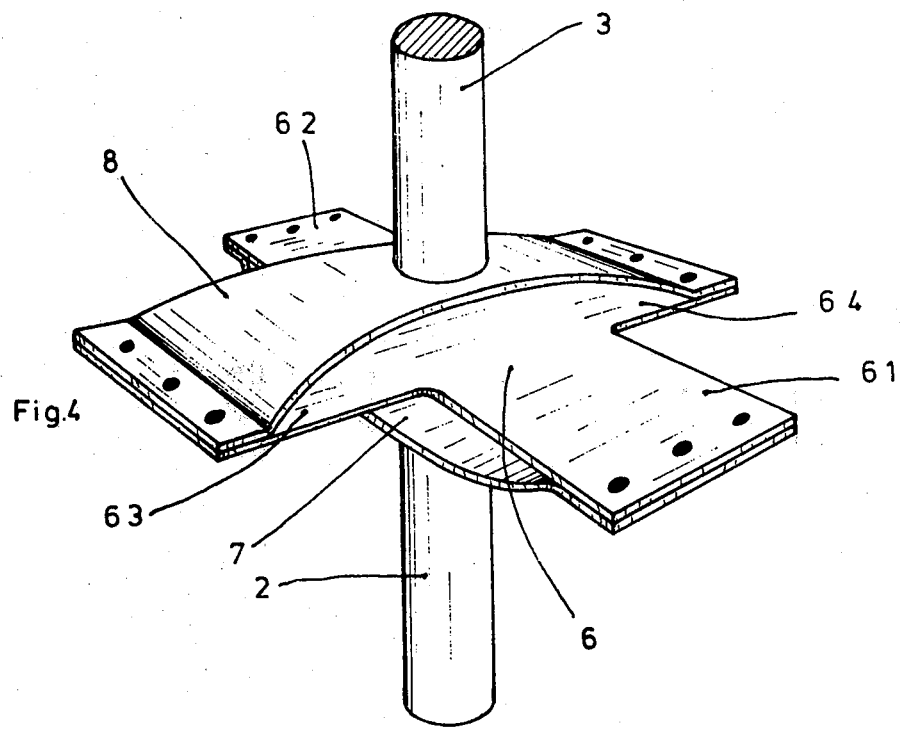
FIG. 4 is a perspective view of a third embodiment of a joint to be used in a steering column according to the invention.

In FIG. 4, the joint 1 is composed of a cross-like metal stamping and two stamped metal strips 7 and 8. The cross-like stamping 6 has four interconnected arms 61, 62, 63 and 64. The metal strip 7 is rigidly connected at its ends by spot welding, for example, to the ends of two opposed arms 61 and 62 of the stamping 6. The length of the metal strip 7 is such that when its ends are secured to the ends of the arms 61 and 62, the strip is bowed outwardly away from the stamping 6. The center portion of the strip 7 is welded or otherwise rigidly connected to the steering shaft 2. The metal strip 8, like the strip 7, is rigidly connected at its ends to the ends of two opposed arms 63 and 64 of the stamping 6. The metal strip 8 is also designed to be outwardly bowed from the stamping 6 and is rigidly connected at its center to the stub shaft 3. The two strips 7 and 8 are located on opposite sides of the stamping 6.

The joints illustrated in FIGS. 1–4 are all capable of transmitting rotary motion of one shaft to a second shaft having an axis that is not aligned with the axis of the first shaft, just as is a conventional universal joint. Inasmuch as metal plate, when subjected to torsional stresses, permits greater elastic deformation than when subjected to bending stresses, the joints of the present invention are designed so that the metal plate of the joints is predominately torsion-stressed.

While the use of the joints illustrated in FIGS. 1–4 is limited in comparison to more complicated and more costly conventional universal joints in that the illustrated joints can be employed only in shaft arrangements where two shafts are oriented at a relatively small angle to each other, the illustrated joints constitute a considerable technical advance because of their relatively simple structure and ease of production, and their advantageous minimal steering elasticity. Each of the illustrated joints or couplings can be produced by stamping, bending, and welding metal plate, specifically steel plate. The joints may be used as either one or both of the joints 1 and 18, illustrated in FIG. 1. Each rigid connection described and illustrated above as a spot weld, for example, may be achieved by any other conventional rigid connection such as a filet weld.

It will be understood that the above described embodiments are merely exemplary and that persons skilled in the art may make many variations and modifications without departing from the spirit and scope of the invention. All such modifications and variations are intended to be within the scope of the invention as defined in the appended claims.

I claim:

1. A steering column for a vehicle having a steering wheel and a steering gear comprising a first rotatable stub shaft coupled to the steering wheel, a second rotatable stub shaft coupled to the steering gear, a rotatable steering shaft extending between the first and second stub shafts, a first coupling means for coupling one end of the steering shaft to the first stub shaft, and a second coupling means for coupling the other end of the steering shaft to the second stub shaft, at least one of the coupling means coupling the steering shaft to one of the stub shafts so as to define an angle between the steering shaft and said one of the stub shafts, said at least one coupling means being relatively torsion-stiff and fabricated of metal plate and including a metal stamping having four arms disposed in a cross-like configuration, a first metal strip rigidly coupled intermediate its ends to an end of the steering shaft and at its ends to two opposed arms of the stamping, and a second metal strip rigidly coupled at its ends to two different opposed arms of the stamping and intermediate its ends to an end of said one of the stub shafts, the first strip being located on one side of the stamping and the second strip being located on the other side of the stamping.

* * * * *